March 30, 1943.    G. S. EMERY    2,315,112
DIRECTIONAL COUPLING
Filed April 6, 1942
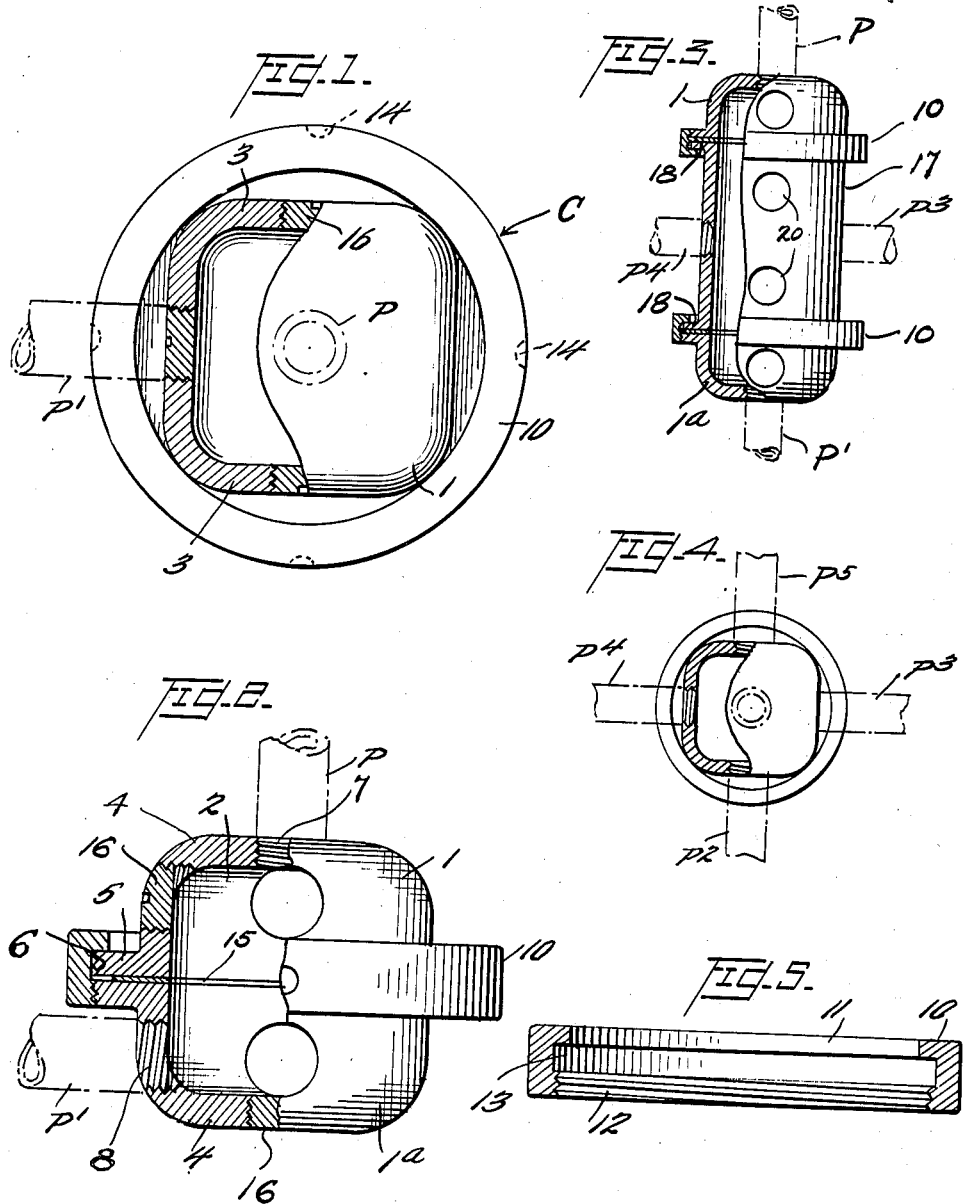
Inventor.
George S. Emery
By Eugene _____
his Attorney Patented Mar. 30, 1943

2,315,112

UNITED STATES PATENT OFFICE 2,315,112

DIRECTIONAL COUPLING

George S. Emery, Tulsa, Okla.

Application April 6, 1942, Serial No. 437,884

3 Claims. (Cl. 285—210)

This invention relates to pipe couplings and has for one of its objects to provide a sectional coupling the sections of which can be united in a manner such as to provide connection between two pipes arranged at any one of a variety of different angles to each other.

Still another object of the invention is to provide a sectional pipe coupling in which the coupling sections are either originally formed, or arranged to be tapped on the job, to provide connection between one or more branch lines and a main line.

Other objects and advantages will be apparent from the following detailed description of a preferred embodiment of the invention, reference being had to the annexed drawing in which:

Figure 1 is a plan view of a pipe coupling partly in cross-section;

Figure 2 is a side view of the coupling partly in cross-section;

Figure 3 is a side view, partly in cross-section, of a modified form of the coupling;

Figure 4 is a plan view, in part cross-sectional, of the coupling of Fig. 3; and Figure 5 is a cross-sectional view of the sleeve for uniting the coupling sections.

In Figs. 1 and 2 of the drawing is shown a sectional pipe coupling C adapted to provide connection between a pair of pipes P and P' indicated in phantom lines. The pipe coupling is composed of the complementary sections 1 and 1a. Each section comprises a generally rectangular box-shaped housing 2 having four side walls 3 and a top wall 4. Extending outwardly from the lower edge of the housing is a circumferential flange 5 provided with flat upper and lower faces, and its circumference being screw-threaded, as indicated at 6.

The pipe coupling section 1a is structurally identical with the coupling section 1 thus far described, corresponding parts thereof being designated by similar reference numerals. Because the coupling sections are alike they may be manufactured rapidly and cheaply. The sections may be supplied to the trade untapped—in which case the ports by which the sections are connected to the pipes to be joined will be tapped on the job—or the sections may be tapped at the factory and marketed in various styles to meet different conditions in the trade. For example, the section 1 is shown as provided with a port 7 opening through the top wall of the housing, while the section 1a is shown as provided with a port 8 opening through a side wall of the housing. These ports are internally screw-threaded for connection to the threaded ends of the pipes to be joined by the coupling.

After the coupling sections 1 and 1a have been screwed onto the ends of the pipes P and P', the pipes are drawn together so that the bottom faces of flanges 5 flatly abut each other, and the sections are secured together by a coupling sleeve 10.

The coupling sleeve comprises a ring-like member having one of its ends provided with an inturned lip 11 and internally screw-threaded from its other end inwardly for a portion of its length, as indicated at 12. Beyond the screw-threaded portion and the lip, the sleeve is formed with an internally recessed portion 13. The sleeve 10 is adapted to be loosely associated with one of the pair of sections 1, 1a when the coupling is marketed so that the parts are complete and the coupling ready for immediate use. When the sections are to be coupled, it is only necessary to rotate the sleeve so that its internal screw threads engage the circumferential threads on the flange of the companion section 1a and draws this flange into tight face-to-face contact with the opposing flange, the recess 13 allowing free turning of the sleeve on the section 1. For turning the sleeve 10, there are provided recesses 14 on its circumference for engagement by a suitable wrench. A packing ring 15 is desirably inserted between the opposed flat faces of the flanges to avoid leakage, and the recess 13 may be filled with grease for the same purpose.

More than one pipe may communicate with a housing of each coupling section. For example, ports if desired may be provided in the top wall and each of the side walls of a housing and closed by screw-threaded plugs 16, the plugs being removed as required to provide port openings for the pipes to be connected. The coupling sections may be assembled either detachably, as by screw-threaded connection, or permanently, as by welding, so as to form a union, an angle, a T, or any other form of multiple branch connection, as conditions may require.

As will be apparent from the foregoing description when two pipes P and P' are to be coupled, a pair of coupling sections 1 and 1a are selected and these are tapped so as to provide openings either through the top wall or through any of the side walls, depending upon the lie of the pipes; or if the sections are marketed with plugged ports already provided therein, the plugs will be removed from the appropriate ports so as to meet the special circumstances. Because the angle of intersection of pipes in the great majority of instances is 45 degrees, and since the sections 1 and 1a are capable of being rotatably adjusted relative to each other through a complete circle in a single plane, the coupling lends itself especially well for quickly and conveniently uniting pipes—and particularly heavy pipes such as cannot readily be bent—that are already installed or otherwise immovable.

In Figs. 3 and 4 is illustrated a modified form of the coupling just described. In this modification the two coupling sections 1 and 1a correspond in all essential respects to the coupling sections of Figs. 1 and 2. Instead of being assembled flange-to-flange, however, there is interposed between the sections an extension piece 17 of tubular construction having laterally disposed flanges 18 located at its opposite ends. The flanges of the coupling sections make flat face-to-face contact with the flanges of the extension piece and the sections are secured to the extension piece by means of sleeves 10, already described. Ports 19 are provided through the wall of the extension piece and these ports are screw-threaded so as to afford connection of branch pipes (indicated P³ and P⁴) therewith, or may be closed by plugs 20.

This form of my coupling is adapted to be used under special circumstances where the coupling of Fig. 1 would not be entirely suitable, such as in the case where the pipes to be connected intersect at other than right angles.

Obviously various changes in the form, construction, arrangement and combination of the several parts of my new pipe coupling may be made and substituted for those herein shown and described without departing from the nature and principle of my invention.

I claim:

1. A pipe coupling comprising a pair of substantially identical complementary sections each comprising a hollow interiorly unobstructed box-shaped housing having flattened top and side walls, a circular flange extending laterally from the lower edge of the housing and a port opening through at least one of the walls of the housing, said sections being arranged with their flanges in opposed relation, and means extending between the opposed flanges of said sections for securing said sections together in rigid assembly, the ports in the two sections having their axes intersecting at approximately at right angles.

2. A pipe coupling comprising a pair of substantially identical complementary sections each comprising a hollow, interiorly-unobstructed housing having flattened top and side walls, a circular flange extending laterally from the lower edge of the housing, ports opening substantially perpendicularly through the top wall of the housing of one section and through at least one of the side walls of the housing of the other section in a plane substantially parallel to the plane of the flange, said sections adapted to be arranged with the flat bottom faces of the flanges in opposed relation, the circumference of one of said flanges being screw-threaded, and an internally screw-threaded sleeve having an inturned lip marginally overlying the flange of one of the sections and threadedly engaging the circumference of the flange of the other section so as to clamp the members in assembly.

3. A pipe coupling comprising a pair of substantially identical complementary sections each comprising a hollow interiorly unobstructed box-shaped housing, a circular flange extending laterally from the lower edge of the housing and a port opening through at least one of the walls of the housing, said sections being arranged in reverse relation, a tubular extension piece interposed between said sections and having terminal flanges overlying the flanges of the sections, and sleeves engaging the flanges of the sections and the extension piece for securing the parts together in rigid assembly, the ports in the two sections having their axes intersecting at approximately right angles.

GEORGE S. EMERY.